US012246432B2

(12) United States Patent
Chang

(10) Patent No.: US 12,246,432 B2
(45) Date of Patent: Mar. 11, 2025

(54) BOX CAPABLE OF REPLACEMENT OF HALF BOX BODY THEREOF

(71) Applicant: Chih-Min Chang, Xiushui Township, Changhua County (TW)

(72) Inventor: Chih-Min Chang, Xiushui Township, Changhua County (TW)

(*) Notice: Subject to any disclaimer, the term of this patent is extended or adjusted under 35 U.S.C. 154(b) by 0 days.

(21) Appl. No.: 18/361,330

(22) Filed: Jul. 28, 2023

(65) Prior Publication Data

US 2024/0326232 A1 Oct. 3, 2024

(30) Foreign Application Priority Data

Mar. 29, 2023 (TW) ................................ 112112049

(51) Int. Cl.
*B25H 3/02* (2006.01)

(52) U.S. Cl.
CPC .................................... *B25H 3/021* (2013.01)

(58) Field of Classification Search
CPC ........... B25H 3/02; B25H 3/003; B25H 3/021
USPC .................................................. 206/379, 373
See application file for complete search history.

(56) References Cited

U.S. PATENT DOCUMENTS 3,474,470 A * 10/1969 Watson .................. A47K 13/12 16/337
6,976,579 B2 * 12/2005 Molnar .................. A45C 11/24
6,988,616 B2 * 1/2006 Chen ...................... B25H 3/003 206/759
7,032,750 B2 * 4/2006 Amtenbrink ........... B25H 3/003 206/379
7,159,712 B1 * 1/2007 Chen ...................... B25H 3/021 206/349
D547,103 S * 7/2007 Huang ........................... D6/634
7,677,391 B2 * 3/2010 Pistor ..................... B25H 3/003 206/372
7,931,143 B1 * 4/2011 Lin ........................ B25H 3/021 220/629
8,336,708 B2 * 12/2012 Potterfield ............... B25H 3/02 206/459.5
D914,603 S * 3/2021 Wang ............................. D3/321
11,717,954 B2 * 8/2023 Heath ...................... B25H 3/02 206/372
2005/0178686 A1 * 8/2005 Pangerc ................. B25H 3/003 206/379
2005/0211587 A1 * 9/2005 Chen ...................... B25H 3/003 206/349

(Continued)

*Primary Examiner* — Ernesto A Grano
(74) *Attorney, Agent, or Firm* — Muncy, Geissler, Olds & Lowe, P.C.

(57) ABSTRACT

This application provides a box capable of replacement of a half box body thereof, which includes a first half box body, a second half box body and a hexagon wrench. The first half box body includes a first pivot connecting portion having a first through hole. The second half box body includes a second pivot connecting portion having a second through hole. A hexagonal transverse segment of the hexagon wrench is inserted in the first and second through holes, making the first half box body and the second half box body pivotably connected as a whole. By the structural configuration of the aforementioned box, the user only has to extract or install the hexagon wrench to the first and second through holes to complete the separation or pivotable connection between the first half box body and the second half box body.

10 Claims, 7 Drawing Sheets

(56) References Cited

U.S. PATENT DOCUMENTS

| | | | | | |
|---|---|---|---|---|---|
| 2006/0011624 | A1* | 1/2006 | Shih | B25H 3/02 | 220/4.24 |
| 2006/0065557 | A1* | 3/2006 | Brunson | B25H 3/003 | 206/273 |
| 2006/0186007 | A1* | 8/2006 | Dost | B25H 3/003 | 206/379 |
| 2008/0149678 | A1* | 6/2008 | Huang | A45F 5/021 | 224/199 |
| 2016/0052125 | A1* | 2/2016 | Steele | B65D 25/205 | 206/349 |
| 2019/0283234 | A1* | 9/2019 | Ko | B25H 3/025 | |
| 2020/0324399 | A1* | 10/2020 | Christen | B25H 3/022 | |

* cited by examiner

BOX CAPABLE OF REPLACEMENT OF HALF BOX BODY THEREOF

BACKGROUND OF THE INVENTION

1. Field of the Invention

This application relates to the structure of a box and specifically speaking, to a structurally improved box, which is capable of replacement of a half box body thereof.

2. Description of the Related Art

The traditional box, such as toolbox, includes a first half box body and a second half box body. The first and second half box bodies both have a pivot connecting portion, and the pivot connecting portions of the first and second half box bodies are connected by a pivot axle, so that the box can be opened or closed. In usual conditions, the pivot connecting portion of one of the half box bodies, such as the first half box body, is fixedly connected with the pivot axle in a tight fit manner, and the pivot connecting portion of the other half box body, such as the second half box body, is pivotably connected with the pivot axle, resulting in that once the pivot axle is installed to the pivot connecting portions of the first and second half box bodies, the user cannot detach the pivot axle from the box and replace one of the half box bodies. In some conditions, such as the condition that the first half box body is loaded with all-purpose wrenches for car repair and the second half box body is loaded with wrenches of special specifications for car repair, such as wrenches of special specifications for repairing American cars, when the user wants to go out to repair Japanese cars for example, a replacement needs to be made for the second half box body and wrenches of special specifications for repairing Japanese cars disposed therein. The structural configuration of the currently available boxes disallows the replacement of the second half box body, resulting in that the user has to buy different boxes for different car specifications, thereby increasing the expenses. It can be seen that the structural configuration of the currently available boxes is faulty and still needs improvement.

SUMMARY OF THE INVENTION

It is one of the objectives of this application to provide a box with a brand-new structural configuration, which is convenient for the replacement of a half box body thereof by the user.

To attain the above objective, this application provides the following technical solution:

A box capable of replacement of a half box body thereof includes a first half box body, a second half box body, and a hexagon wrench. The first half box body includes a first pivot connecting portion. The first pivot connecting portion has a first through hole. The second half box body includes a second pivot connecting portion. The second pivot connecting portion has a second through hole. The second pivot connecting portion is located on a side of the first pivot connecting portion, and the first through hole communicates with the second through hole linearly. The aforementioned hexagon wrench includes a hexagonal transverse segment and a hexagonal longitudinal segment, which are connected integrally. The hexagonal transverse segment is inserted in the first through hole of the first pivot connecting portion and the second through hole of the second pivot connecting portion in a way that the first half box body and the second half box body are pivotably connected as a whole.

By the above-described structural configuration of the box, when the user needs to replace the first half box body or the second half box body, the user only has to extract the hexagon wrench to separate two half box bodies. After that, the user can make a replacement by another half box body for the second half box body for example, and re-insert the hexagonal transverse segment of the hexagon wrench into the through holes of the first pivot connecting portion and the second pivot connecting portion, such that the pivotable connection of the first half box body and the second half box body is accomplished.

In one of the aspects, the first through hole is a hexagonal hole, and the second through hole is a circular hole, so that the first half box body can be rotated with the hexagon wrench synchronously. In some conditions, the first through hole may be a circular hole, and the second through hole is a hexagonal hole.

In another aspect, the cross-sectional size and shape of the first through hole are substantially the same with the cross-sectional size and shape of the hexagonal transverse segment, so that the first half box body can be fixedly connected with the hexagonal transverse segment of the hexagon wrench firmly, enabling the first half box body and the hexagon wrench to be rotated synchronously.

In another aspect, in some conditions, the length of the hexagonal transverse segment is larger than the length of the hexagonal longitudinal segment. But in some conditions, the length of the hexagonal transverse segment may be smaller than the length of the hexagonal longitudinal segment.

In another aspect, because the hexagon wrench has a plurality of sets of a first angular end and a second angular end arranged in a subtended manner, the distance between the first angular end and the second angular end may be configured to be substantially equal to the diameter of the second through hole, for enabling the second half box body to be smoothly pivoted relative to the hexagon wrench by taking the hexagon wrench as a fixed axle.

In another aspect, in order for positioning the hexagon wrench, the first half box body may be further provided on an inside surface thereof with a first accommodating trough. The first accommodating trough has a trough bottom, a trough wall, and a slope structure. The slope structure is provided on the trough bottom in a way that the hexagonal longitudinal segment of the hexagon wrench can pass over the slope structure to be positioned between the trough wall and the slope structure.

In another aspect, in order to prevent the hexagon wrench from structural interference with the inside surface of the second half box body, the second half box body may be further provided on the inside surface thereof with a second accommodating trough. The second accommodating trough also has a trough bottom, and the second accommodating trough is located correspondingly to the hexagonal longitudinal segment, so that when the first half box body and the second half box body are located at a close position, the hexagonal longitudinal segment of the hexagon wrench can be accommodated between the first accommodating trough and the second accommodating trough.

In another aspect, the first pivot connecting portion and the second pivot connecting portion both have a hollow hole. The hollow hole of the first pivot connecting portion communicates with the first through hole. The hollow hole of the second pivot connecting portion communicates with the second through hole.

In another aspect, the first pivot connecting portion is directly adjacent to the second pivot connecting portion.

BRIEF DESCRIPTION OF THE DRAWINGS

The detailed structure, features, assembly or usage manner of the box capable of replacement of a half box body thereof will be described in the following embodiments. However, it should be understandable that the embodiments and the accompanying drawings to be described herein below are given by way of illustration only, not limitative of the claims of the present invention, and wherein:

DETAILED DESCRIPTION OF THE INVENTION

The technical content and features of the present invention will be detailedly described by the instanced embodiments and the accompanying drawings given herein below. The directional terms mentioned in the content of this specification, such as 'above', 'below', 'in', 'out', 'top' and 'bottom' are all just for illustrative description on the basis of normal usage direction, not intended to limit the claimed scope. For the detailed description of the technical features of the present invention, two embodiments are instanced herein below and described in coordination with the accompanying drawings.

Figure 1:
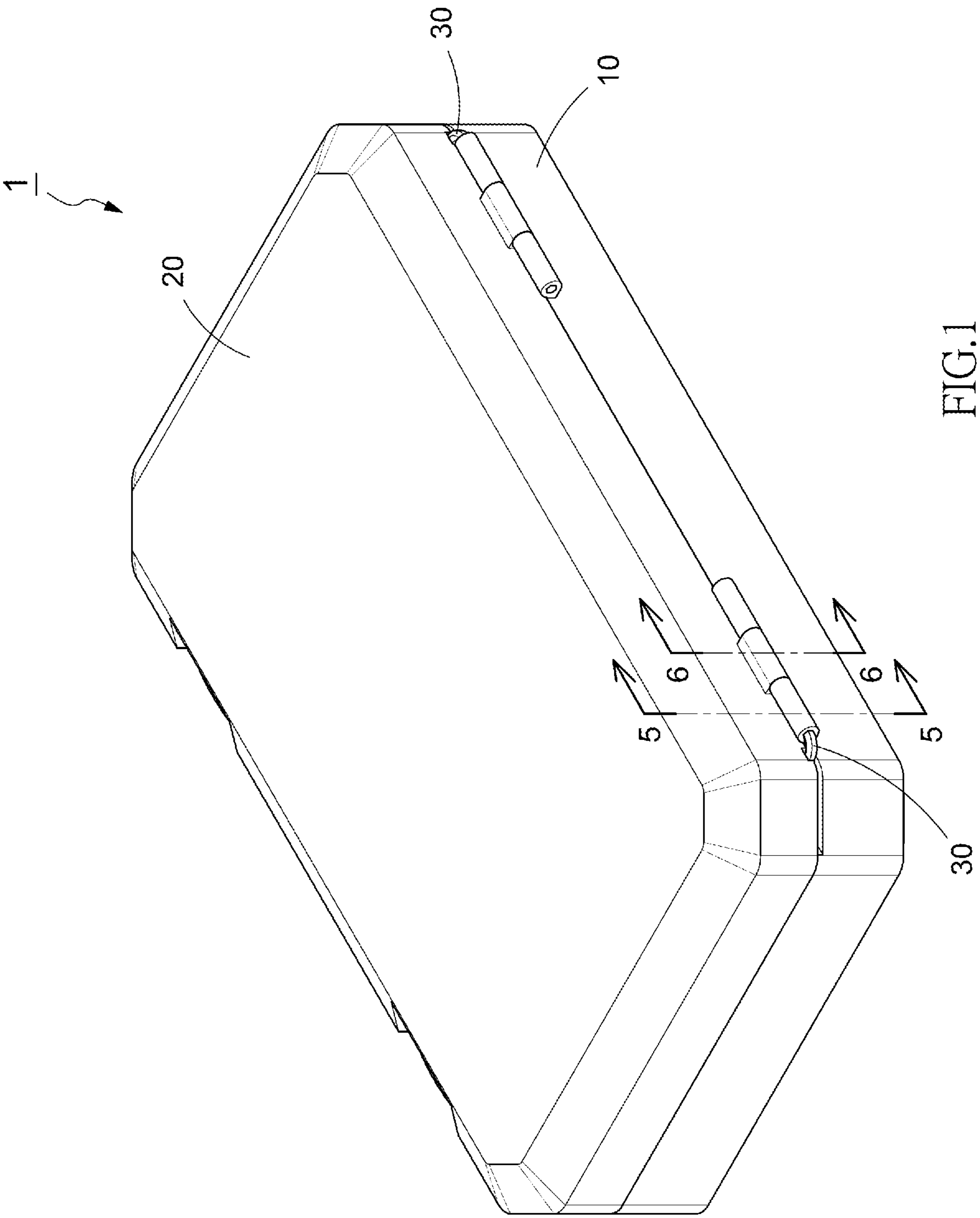
FIG. 1 is a perspective view of a box of a first embodiment, showing that the box is in the close status.

As shown in FIG. 1, a box 1 provided by a first embodiment of this application includes a first half box body 10, a second half box body 20, and two hexagon wrenches 30.

Figure 2:
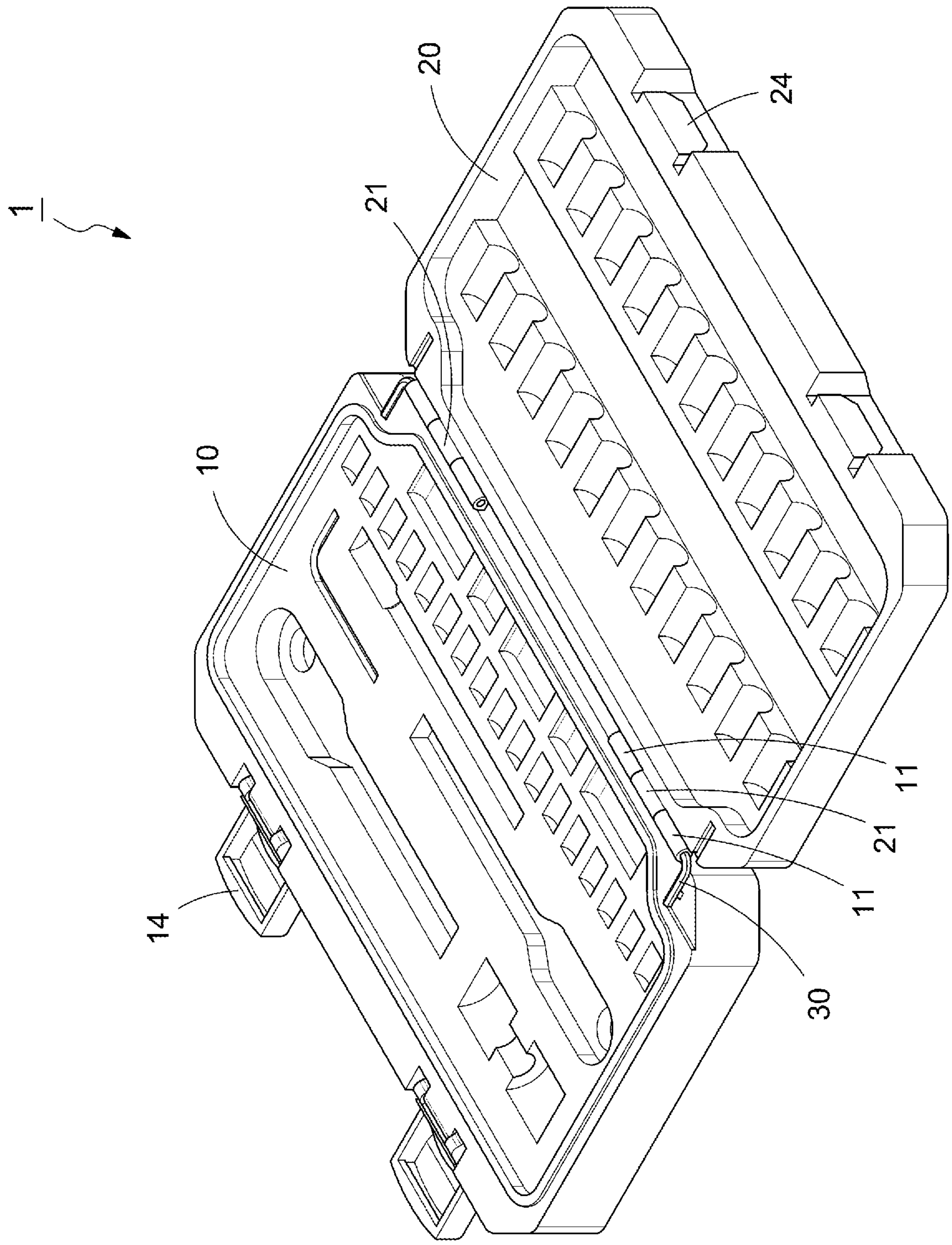
FIG. 2 is a perspective view of the box of the first embodiment, showing that the box is in the open status.
Figure 3:
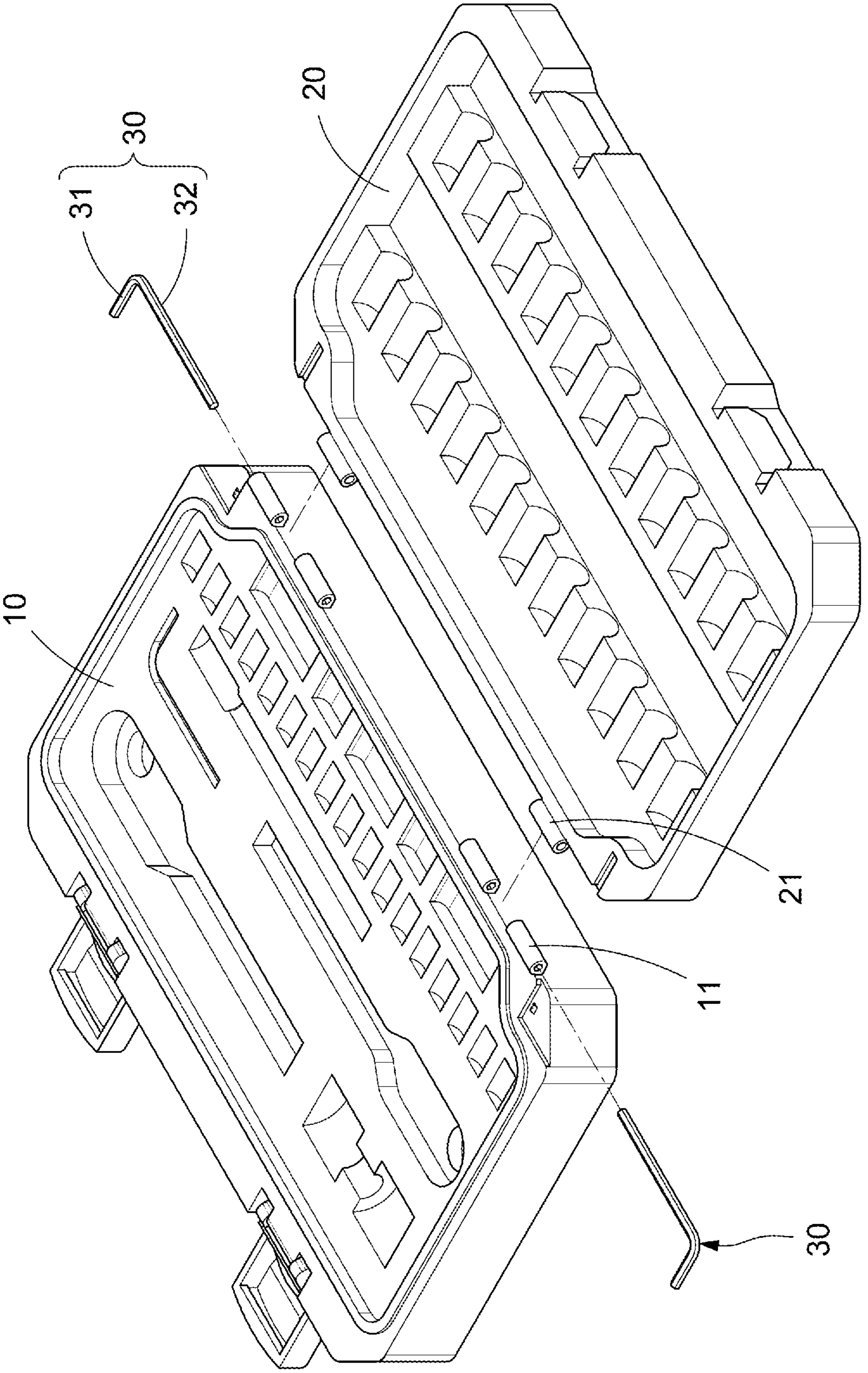
FIG. 3 is an exploded view of FIG. 2.
Figure 4:
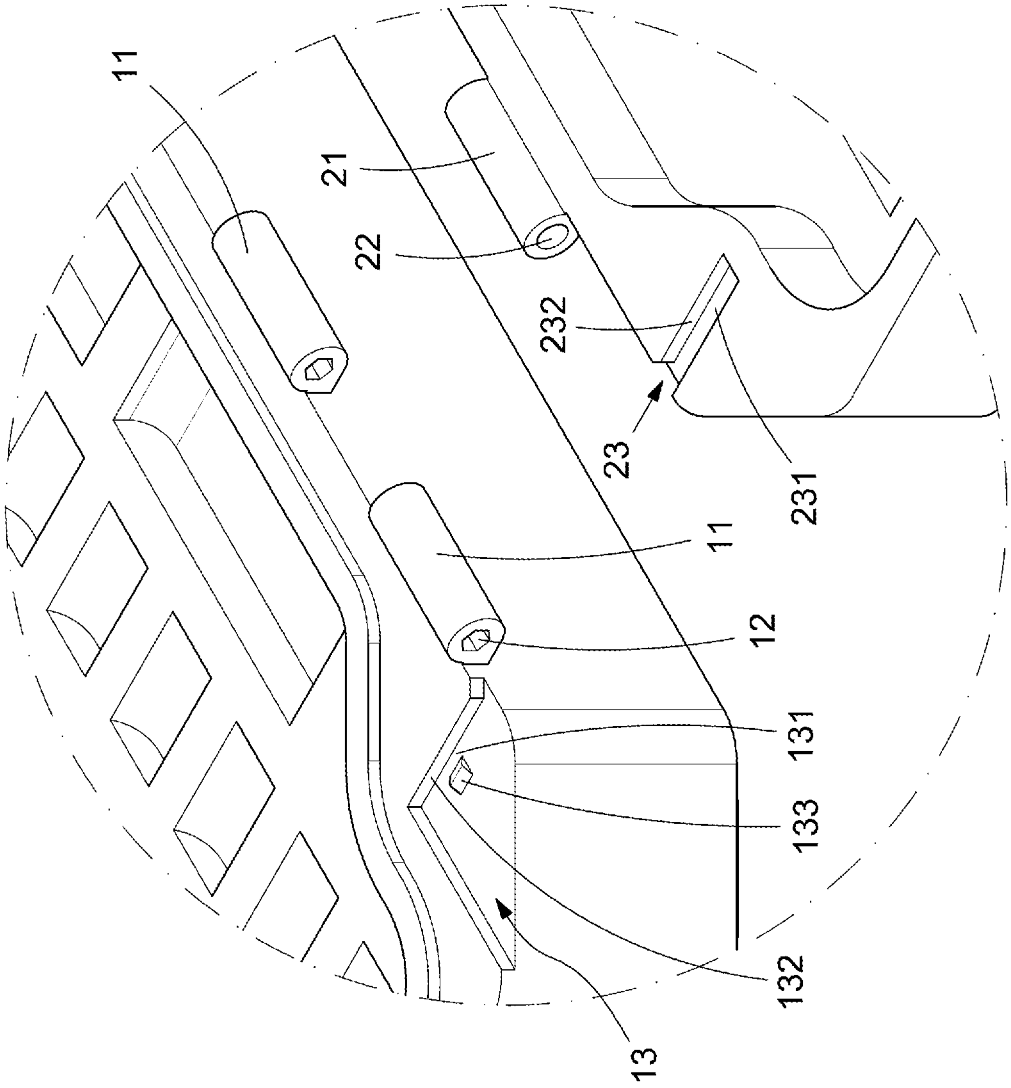
FIG. 4 is a partial enlarged view of FIG. 3, which omits showing the hexagon wrench.
Figure 5:
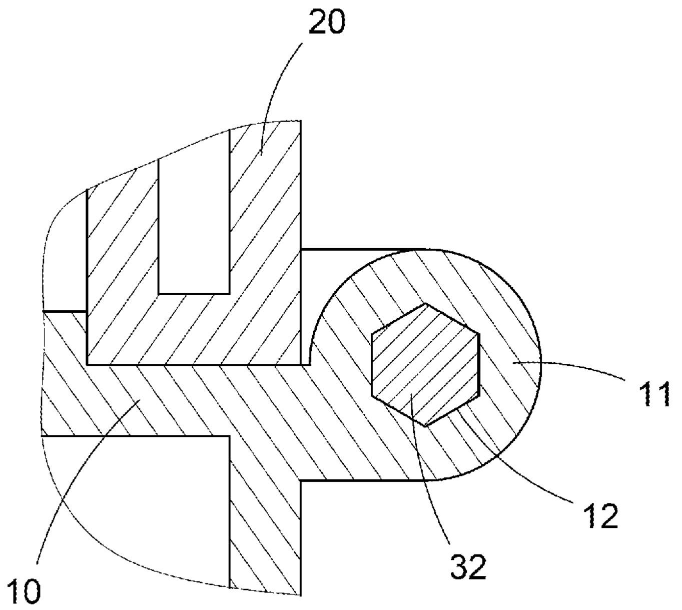
FIG. 5 is a partial sectional view taken along the line 5-5 in FIG. 1.

Referring to FIG. 2 to FIG. 4, the first half box body 10 includes two first pivot connecting portion groups. Every first pivot connecting portion group has two first pivot connecting portions 11, and the two first pivot connecting portions 11 are arranged apart from each other. Every first pivot connecting portion 11 has a first through hole 12. The first through hole 12 penetrates through two opposite sides of the first pivot connecting portion 11. In this embodiment, the first through hole 12 is a hexagonal hole (shown in FIG. 5). Besides, as shown in FIG. 3 and FIG. 4, the first half box body 10 is provided on the inside surface thereof with two first accommodating troughs 13. Every first accommodating trough 13 has a trough bottom 131, a trough wall 132, and a slope structure 133. The slope structure 133 is provided on the trough bottom 131. The first half box body 10 further has two buckles 14.

Figure 6:
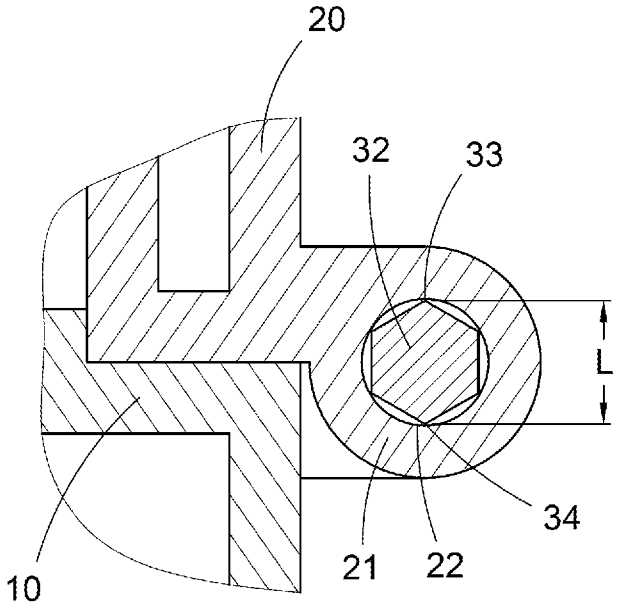
FIG. 6 is a partial sectional view taken along the line 6-6 in FIG. 1.

The second half box body 20 includes two second pivot connecting portions 21 arranged apart from each other. Every second pivot connecting portion 21 is located between two first pivot connecting portions 11 of every first pivot connecting portion group, which means the second pivot connecting portion 21 is located on a side of the first pivot connecting portion 11, and the second pivot connecting portion 21 is directly adjacent to the first pivot connecting portion 11. Every second pivot connecting portion 21 has a second through hole 22. The first through hole 12 communicates with the second through hole 22 linearly. In this embodiment, the second through hole 22 is a circular hole (shown in FIG. 6). Similarly, the second half box body 20 is provided on the inside surface thereof with two second accommodating troughs 23. Every second accommodating trough 23 has an elongated shape, and has a trough bottom 231 and two trough walls 232 provided oppositely. The second half box body 20 further has two buckling portions 24. The buckles 14 can be buckled to the buckling portions 24.

Referring to FIG. 3 particularly, the hexagon wrench 30 includes a hexagonal transverse segment 32 and a hexagonal longitudinal segment 31, which are connected integrally. In this embodiment, the length of the hexagonal transverse segment 32 is larger than the length of the hexagonal longitudinal segment 31. The cross-sectional size of the hexagonal transverse segment 32 is substantially equal to the cross-sectional size of the first through hole 12. The cross-sectional shape of the hexagonal transverse segment 32 and the cross-sectional shape of the first through hole 12 are both hexagon (shown in FIG. 5). The hexagonal transverse segment 32 has a first angular end 33 and a second angular end 34 arranged in a subtended manner (shown in FIG. 6). The distance L between the first angular end 33 and the second angular end 34 is substantially equal to (or at least larger than) the diameter of the second through hole 22. The hexagonal transverse segment 32 of every hexagon wrench 30 is inserted in the first through holes 12 of the aforementioned two first pivot connecting portions 11 and the second through hole 22 of the second pivot connecting portion 21, so that the first half box body 10 and the second half box body 20 can be pivotably connected as a whole. Because the cross-sectional shape of the hexagonal transverse segment 32 and the cross-sectional shape of the first through hole 12 are both hexagon and the two are substantially the same in size, the first half box body 10 and the hexagon wrench 30 can be only rotated synchronously. By comparison, the second through hole 22 is a circular hole, and the diameter of the second through hole 22 is substantially equal to the distance L between the first angular end 33 and the second angular end 34 of the hexagonal transverse segment 32, so that the second half box body 20 is pivotable relative to the hexagonal transverse segment 32 of the hexagon wrench 30 by taking the hexagon wrench as a fixed axle. As shown in FIG. 2 and FIG. 4, in the process that the hexagonal transverse segment 32 of the hexagon wrench 30 is inserted into the first through holes 12 of the first pivot connecting portions 11 and the second through hole 22 of the second pivot connecting portion 21, the hexagonal longitudinal segment 31 of the hexagon wrench 30 passes over the slope structure 133 to enter between the trough wall 132 and the slope structure 133 of the first accommodating trough 13, so that the hexagonal longitudinal segment 31 can be positioned between the aforementioned trough wall 132 and the slope structure 133. A depth is formed by the trough bottom 131 of the first accommodating trough 13 in coordination with the trough bottom 231 of the second accommodating trough 23. When the first half box body 10 and the second half box body 20 are located at a close position, the position of the second accommodating trough 23 corresponds to the position of the hexagonal longitudinal segment 31, and the depth between the trough bottom 131 of the first accommodating trough 13 and the trough bottom 231 of the second accommodating trough 23 is larger than the size of the hexagon wrench 30, preventing the hexagon wrench 30 and the second half box body 20 from structural interference.

It should be mentioned that the amounts of the first pivot connecting portion 11 and the second pivot connecting portion 21 may be increased or decreased according to the practical demand. In some conditions, the amounts of the first pivot connecting portion 11 and the second pivot connecting portion 21 may be both only one, and only one hexagon wrench 30 is used to connect the first pivot connecting portion 11 and the second pivot connecting portion 21.

By the structural configuration of the aforementioned box 1, when the user needs to replace the first half box body 10 or the second half box body 20, the user only has to extract the hexagon wrench 30 to separate two half box bodies 10 and 20. After that, the user can make a replacement by another half box body, such as the replacement by another second half box body, and re-insert the hexagonal transverse segment 32 of the hexagon wrench 30 into the through holes of the first pivot connecting portion 11 and the after-replacement second pivot connecting portion, such that the pivotable connection of the first half box body 10 and the after-replacement second half box body is accomplished and thus the replacement is accomplished.

Figure 7:
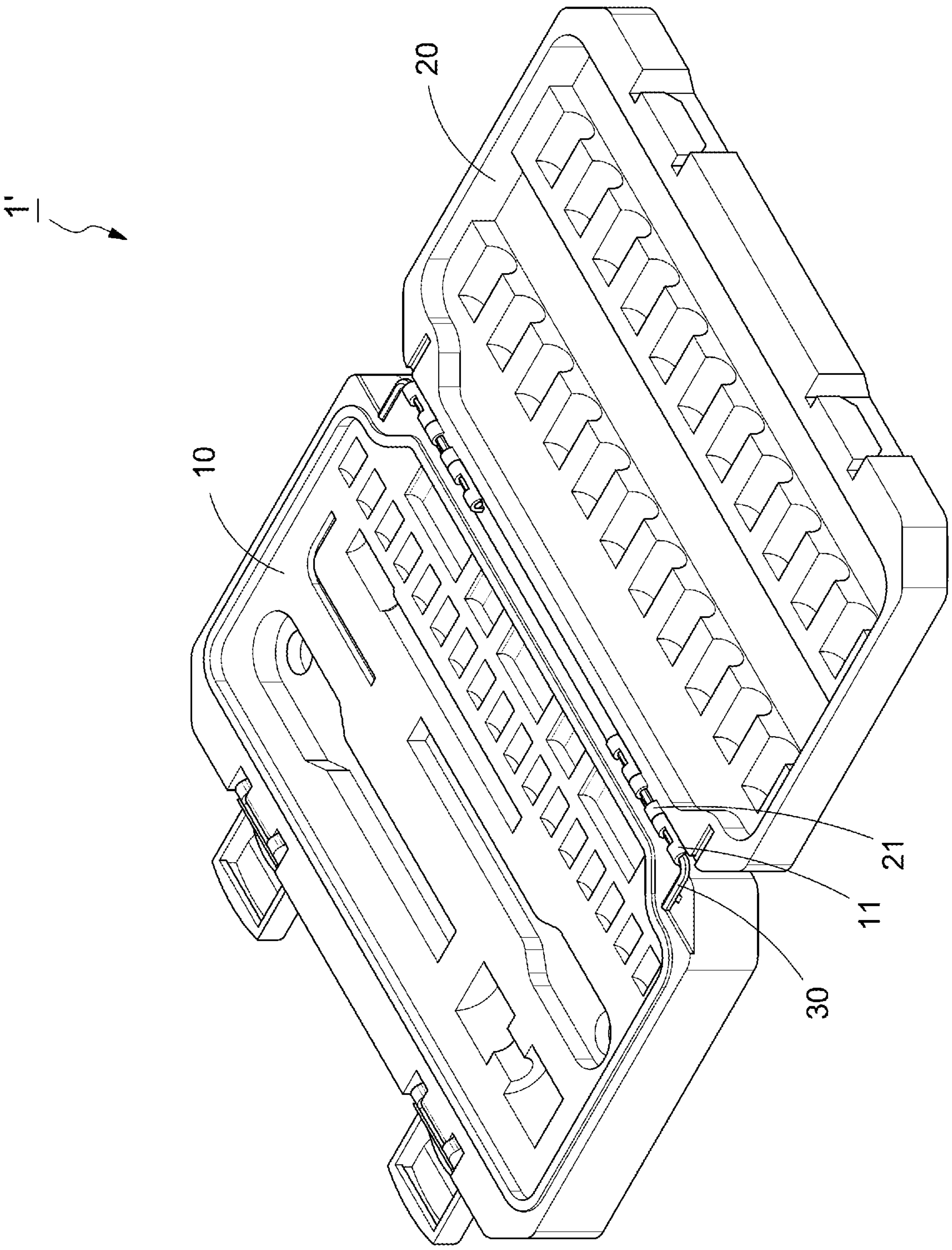
FIG. 7 is a perspective view of a box of a second embodiment, showing that the box is in the open status.
Figure 8:
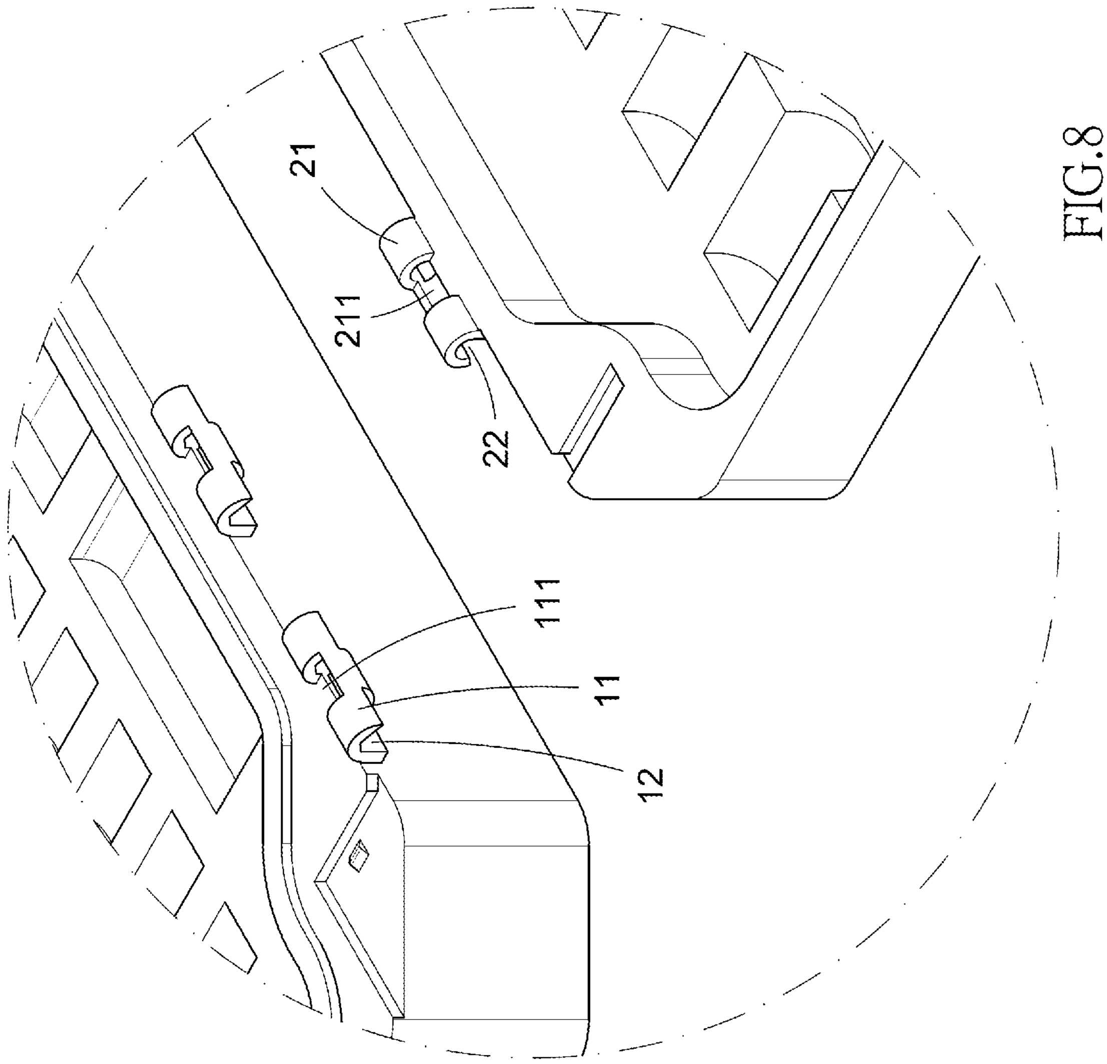
FIG. 8 is a partial enlarged view of FIG. 7, which omits showing the hexagon wrench.

This application further provides a second embodiment. Referring to FIG. 7 and FIG. 8, a box 1' of the second embodiment is approximately the same in structure with the first embodiment. One of the structural differences is that each of the first pivot connecting portions 11 and the second pivot connecting portions 21 has a hollow hole 111 or 211. The hollow hole 111 of the first pivot connecting portion 11 communicates with the first through hole 12. The hollow hole 211 of the second pivot connecting portion 21 communicates with the second through hole 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A box capable of replacement of a half box body thereof, the box comprising:

a first half box body comprising a first pivot connecting portion, the first pivot connecting portion having a first through hole;

a second half box body comprising a second pivot connecting portion, the second pivot connecting portion having a second through hole, the second pivot connecting portion being located on a side of the first pivot connecting portion, the first through hole communicating with the second through hole linearly; and a hexagon wrench comprising a hexagonal transverse segment and a hexagonal longitudinal segment, which are integrally connected, the hexagonal transverse segment being inserted in the first through hole of the first pivot connecting portion and the second through hole of the second pivot connecting portion in a way that the first half box body and the second half box body are pivotably connected as a whole.

2. The box as claimed in claim 1, wherein the first through hole is a hexagonal hole.

3. The box as claimed in claim 2, wherein cross-sectional size and shape of the first through hole are substantially the same with cross-sectional size and shape of the hexagonal transverse segment.

4. The box as claimed in claim 1, wherein a length of the hexagonal transverse segment is larger than a length of the hexagonal longitudinal segment.

5. The box as claimed in claim 1, wherein the second through hole is a circular hole.

6. The box as claimed in claim 5, wherein the hexagonal transverse segment has a first angular end and a second angular end, which are arranged in a subtended manner; a distance between the first angular end and the second angular end is substantially equal to a diameter of the second through hole.

7. The box as claimed in claim 1, wherein the first half box body is provided on an inside surface thereof with a first accommodating trough; the first accommodating trough has a trough bottom, a trough wall and a slope structure; the slope structure is provided on the trough bottom; the hexagonal longitudinal segment is located between the trough wall and the slope structure.

8. The box as claimed in claim 7, wherein the second half box body is provided on an inside surface thereof with a second accommodating trough; the second accommodating trough has a trough bottom; the second accommodating trough is located correspondingly to the hexagonal longitudinal segment.

9. The box as claimed in claim 1, wherein the first pivot connecting portion is directly adjacent to the second pivot connecting portion.

10. The box as claimed in claim 1, wherein the first pivot connecting portion and the second pivot connecting portion both have a hollow hole; the hollow hole of the first pivot connecting portion communicates with the first through hole; the hollow hole of the second pivot connecting portion communicates with the second through hole.

* * * * *